W. BARNETT.
HAT PIN ATTACHMENT.
APPLICATION FILED MAY 21, 1913.
1,084,190.
Patented Jan. 13, 1914.
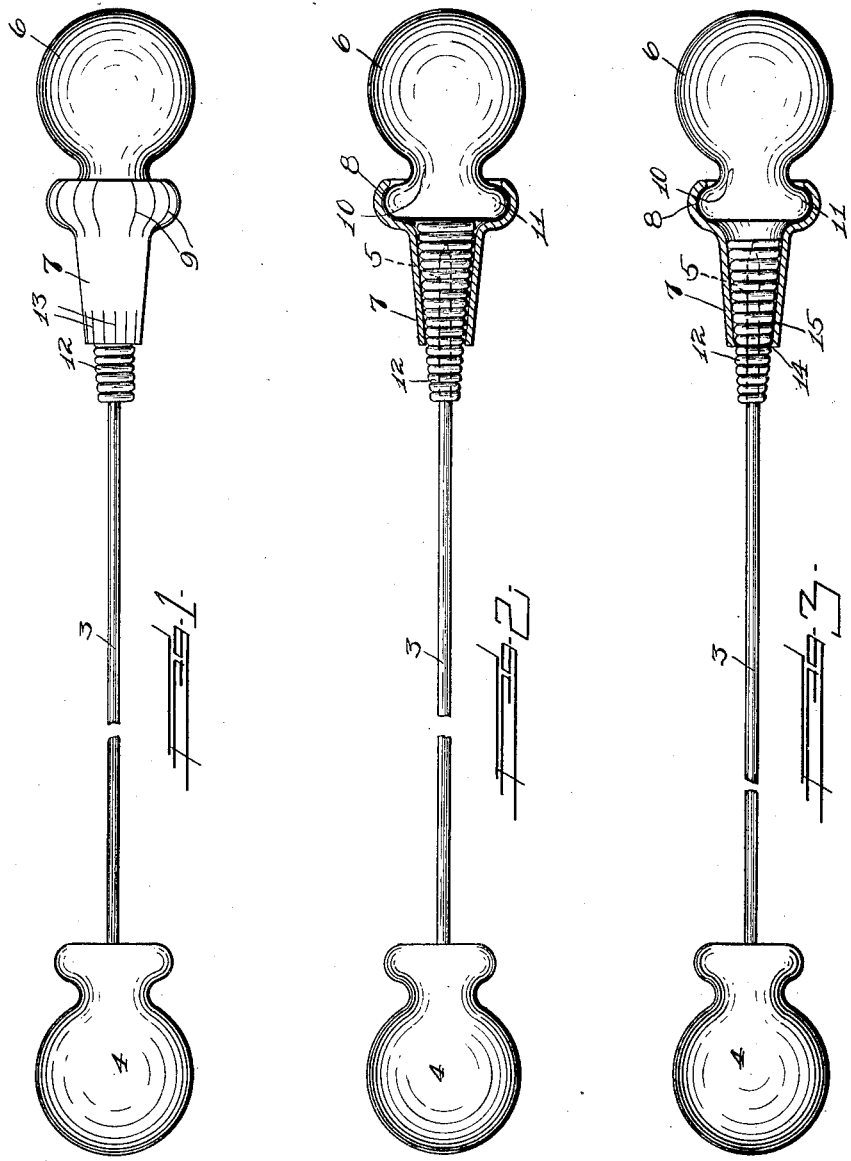
Witnesses
J. M. Lyles.
Inventor
Wheeler Barnett,
By C. L. Parker
Attorney

UNITED STATES PATENT OFFICE.

WHEELER BARNETT, OF KNOXVILLE, TENNESSEE.

HAT-PIN ATTACHMENT.

1,084,190. Specification of Letters Patent. Patented Jan. 13, 1914.

Application filed May 21, 1913. Serial No. 769,017.

*To all whom it may concern:*

Be it known that I, WHEELER BARNETT, a citizen of the United States, residing at Knoxville, in the county of Knox and State of Tennessee, have invented certain new and useful Improvements in Hat-Pin Attachments, of which the following is a specification.

My invention relates to a device to be detachably connected with a hat pin, to prevent the same being lost and to cover the pointed end thereof to prevent accidents, and has particular reference to means of this character embodying a coil spring which is connected with a head in a novel manner.

An important object of this invention is to provide means of the above mentioned character, which are neat and attractive in appearance, strong, and durable.

A further object of this invention is to provide means for attaching a coil spring, preferably a tapered coil spring, to a preferably non-metallic head, without the employment of solder, screws, or the like.

A further object of this invention is to provide a hat pin attachment of the above mentioned character, embodying means whereby the head is detachably connected with the socket thereof so that the operator may remove such head and substitute another therefor, when desired.

Other objects and advantages of this invention will be apparent during the course of the following description.

In the accompanying drawings forming a part of this specification and in which like numerals are employed to designate like parts throughout the same, Figure 1 is a side view of my device applied to the pointed end of a hat pin, Fig. 2 is a central longitudinal sectional view through the same, and, Fig. 3 is a similar view through a different form of the device.

In the drawings, wherein for the sake of illustration, is shown a preferred embodiment of my invention, the numeral 3 designates a hat pin provided at one end with a head 4, preferably formed of china, of the shape shown, and simulating pearl.

The numeral 5 designates the pointed end of the hat pin.

The numeral 6 designates the head of my improved device, formed of china or glass, preferably of the shape shown and simulating pearl.

The numeral 7 designates a tapered tubular casing, which may be formed of any suitable metal, such as silver, gold, nickel, or some other metal plated with the same. This tapered tubular casing has its large end bent outwardly for forming an annular socket 8, the same being rendered suitably resilient by being cut or split at points 9. This large resilient socket end is adapted to receive a reduced extension 10 of the head 6, such reduced extension being in turn provided at its end with an annular flange or enlargement 11. It is thus seen that the extension 10 may be forced into the large resilient socket end 8, the flange 11 fitting within the same and securely holding the head 6 to the tapered casing 7. The socket end 8 is sufficiently stiff to prevent an accidental separation of the head 6 from the tapered tubular casing 7, but allowing the same to be separated when proper and sufficient force is applied thereto. This is an important feature of the invention, as it is often advantageous to remove the head 6, and substitute therefor a second head, of different shape and appearance to correspond with the appearance of the head of the hat pin, such second head however being provided with a shank of the same size and shape. It is thus seen that the tapered tubular casing 7 is securely attached to the head 6, to be removed therefrom at will, without the employment of solder, screws, or similar attaching means.

The numeral 12 designates a tapered coil spring, fitting within the tapered tubular casing 7, such tubular casing and tapered coil spring both decreasing in diameter outwardly with respect to the head 6. The reduced end of the spring 12 extends for a considerable distance outwardly beyond the reduced end of the casing 7, as shown. The pointed end 5 of the hat pin is inserted in the tapered coil spring 12 and is held thereby. In order that the outer portion of this coil spring may be properly expanded by the hat pin 3, to produce the desired gripping action, the small end of the casing 7, is rendered suitably resilient by splitting the same longitudinally, at the points 13. It is thus seen that the extension 10 will limit the longitudinal movement of the spring 12 in one direction, while the casing 7 will limit the longitudinal movement thereof in the opposite direction, such spring being properly connected with the head 6 without the employment of solder, or any other means for attaching an individual turn of the same to the head, whereby the structure is rendered more strong and durable.

In Fig. 3, I have shown a slightly modified form of the invention. In this figure the small end of the tapered tubular casing 7 is provided with an inwardly extending annular flange 14, having screw-threaded engagement with turns of the tapered coil spring 12 to clamp the same against the wall of the casing 7, thus preventing the longitudinal displacement of the spring. In this form of the invention the opposite ends of the tapered casing 7 are split, as shown in Fig. 1.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:—

1. A device to be detachably connected with the pointed end of a hat pin, comprising a head provided with a flanged shank, a tapered tubular casing having one end thereof provided with an outwardly extending suitably resilient and stiff socket for receiving the flanged shank for securely detachably connecting the tapered tubular casing with the head, and a tapered coil spring mounted within the tubular casing and decreasing in diameter in the same direction with relation thereto.

2. A device to be detachably connected with the pointed end of a hat pin, comprising a head, a tapered tubular casing connected therewith and decreasing in diameter with relation thereto, a tapered coil spring mounted within the tubular casing and decreasing in diameter in the same direction with relation thereto, and an inwardly extending annular flange carried by the outer reduced end of the tubular casing to have screw-threaded engagement with the turns of the coil spring, whereby the coil spring may be clamped against the wall of the tubular casing and held thereby against longitudinal movement with relation thereto.

3. A device to be detachably connected with the pointed end of a hat pin, comprising a tapered tubular casing open at both ends, a tapered coil spring mounted within the tapered tubular casing with its reduced end extending toward the reduced end of the tapered tubular casing, and a head having a portion thereof extending into the large end of the tapered tubular casing to be secured therein.

In testimony whereof I affix my signature in presence of two witnesses.

WHEELER BARNETT.

Witnesses:
A. D. ALBRIGHT,
S. R. McKELSEY.